April 21, 1931.  J. W. TATTER  1,801,988
STEERING CONTROL FOR CREEPER TYPE TRACTORS
Filed Nov. 4, 1927   4 Sheets-Sheet 1

INVENTOR:
John W. Tatter
By Chindahl Parker & Carlson
Attys.

April 21, 1931. J. W. TATTER 1,801,988
STEERING CONTROL FOR CREEPER TYPE TRACTORS
Filed Nov. 4, 1927   4 Sheets-Sheet 2

INVENTOR:
John W. Tatter
By Chindahl Parker Carlson
Att'ys.

INVENTOR:
John W. Tatter
By Chindahl Parker Carlson
Att'ys.

Patented Apr. 21, 1931

1,801,988

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

STEERING CONTROL FOR CREEPER TYPE TRACTORS

Application filed November 4, 1927. Serial No. 230,975.

The invention relates to mechanism for the selective transmission of power to the driving wheels in tractors of the "creeper" type employing endless belt treads for tractive propulsion whereby the tractor may be steered in its direction of travel.

In tractors of this type the turning of direction of travel of the tractor is effected by causing a difference of speed in the two belt treads, or by releasing one or the other of the belt treads from the driving power while the other continues operation under power. To make a short turn, the released tread driving wheel may be braked to further retard the tractor belt on that side and effect the more rapid swinging of the tractor as a whole. In such tractors heretofore in use and wholly supported on belt treads, clutch operating and braking means are commonly provided for manual operation by the driver of the tractor, requiring much effort on the part of the driver for their manipulation while under power.

It is one of the objects of the present invention to provide automatically operable clutch means in a "creeper" type tractor which may be controlled to engage or disengage either tread driving wheel selectively in relation to the power transmission.

Another object is to provide automatically operable clutch means in the power transmission to the tread driving wheel which may be manually actuated to release either driving wheel selectively from power connection, at the will of the driver, and may be automatically actuated to release either driving wheel upon acceleration of speed of the tread driven thereby.

A further object is to provide power means for effecting the disengagement of the driving clutches in the tread driving transmission train, in association with manually controlled actuating devices, whereby steering is accomplished by a unitary steering control and with a minimum of effort.

A further object is to provide selectively operable driving clutch means which is self contained, compact of arrangement, and of sturdy construction to withstand hard usage.

Other objects and advantages will be apparent in the following detailed description of a preferred embodiment of the invention which has been selected for illustration in the accompanying drawings. It will be understood, however, that many changes in form and construction may be made by those skilled in the art without departing from the scope and spirit of the invention as expressed in the appended claims.

Referring to the drawings.

Figure 1:
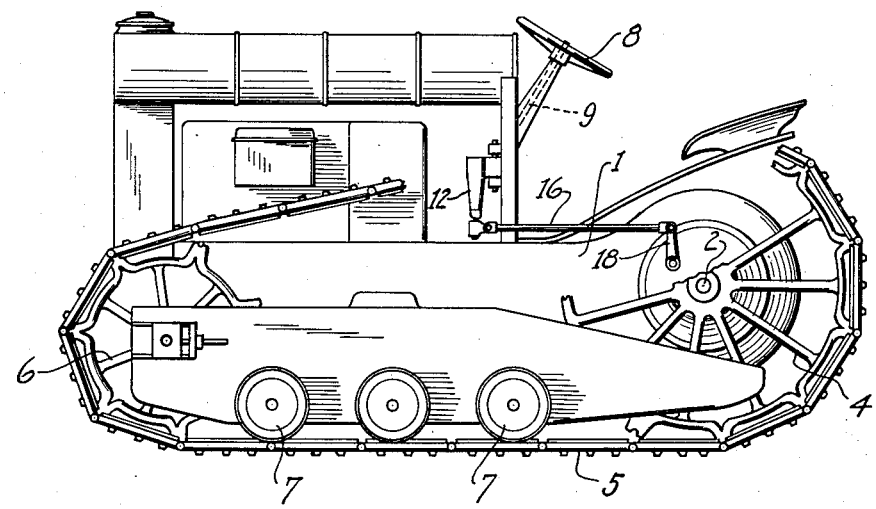
Figure 1 represents in side elevation a tractor of the belt tread "creeper" type, in which a portion of the tread has been cut away to disclose the operating connections between the steering post and the clutch actuating devices.
Figure 8:
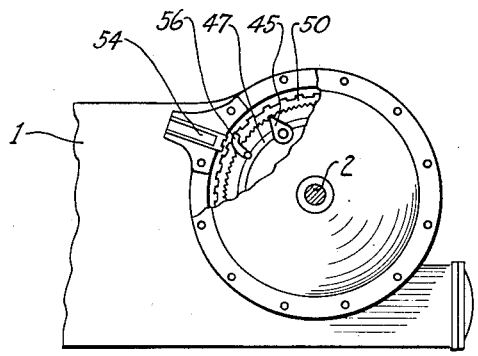
Fig. 8 is a fractional view of the main housing with a portion broken away to illustrate the details of the differential clutch mechanism.

Referring to the drawings the reference numeral 1 indicates the main body or main housing of the tractor unit, in the rear portion of which is supported a pair of transverse driving axles 2 and 3, carrying the driving wheels, of which one is illustrated at 4 in Fig. 1, which operatively support and drive the belt treads at each side of the machine, as illustrated at 5 in Fig. 1. The belt treads may be frontwardly supported as on an idler wheel 6 mounted in the frame of the tractor, and the intermediate bearing run of the belt may be supported in tractive contact with the surface over which the tractor is being moved by idler rollers 7.

The steering control of the tractor preferably is accomplished through a conventional steering wheel 8 (see Fig. 1) mounted on a steering post and having a steering shaft 9 secured thereto, which preferably carries at its lower end a pinion 10 (see Fig. 2), the latter being in engagement with an internal gear 11 rigidly secured to a cross bar 12 supported for swinging movement about an intermediate pivotal axis indicated at 13.

The bar 12 is provided at its extremities with connecting rods 14 and 15 which are operatively connected with conventional braking devices provided on the driving wheels or axles, and which, forming no part of the present invention, are not herein illustrated. Spaced from the ends of the bar 12 is provided another pair of connecting rods 16 and 17 pivotally secured to the bar 12 and extending rearwardly to a pair of cranks 18 and 19. The latter effect the control, through the swinging of the bar 12 about its pivotal axis, of the driving axle clutches, in the manner hereinafter described.

Figure 2:
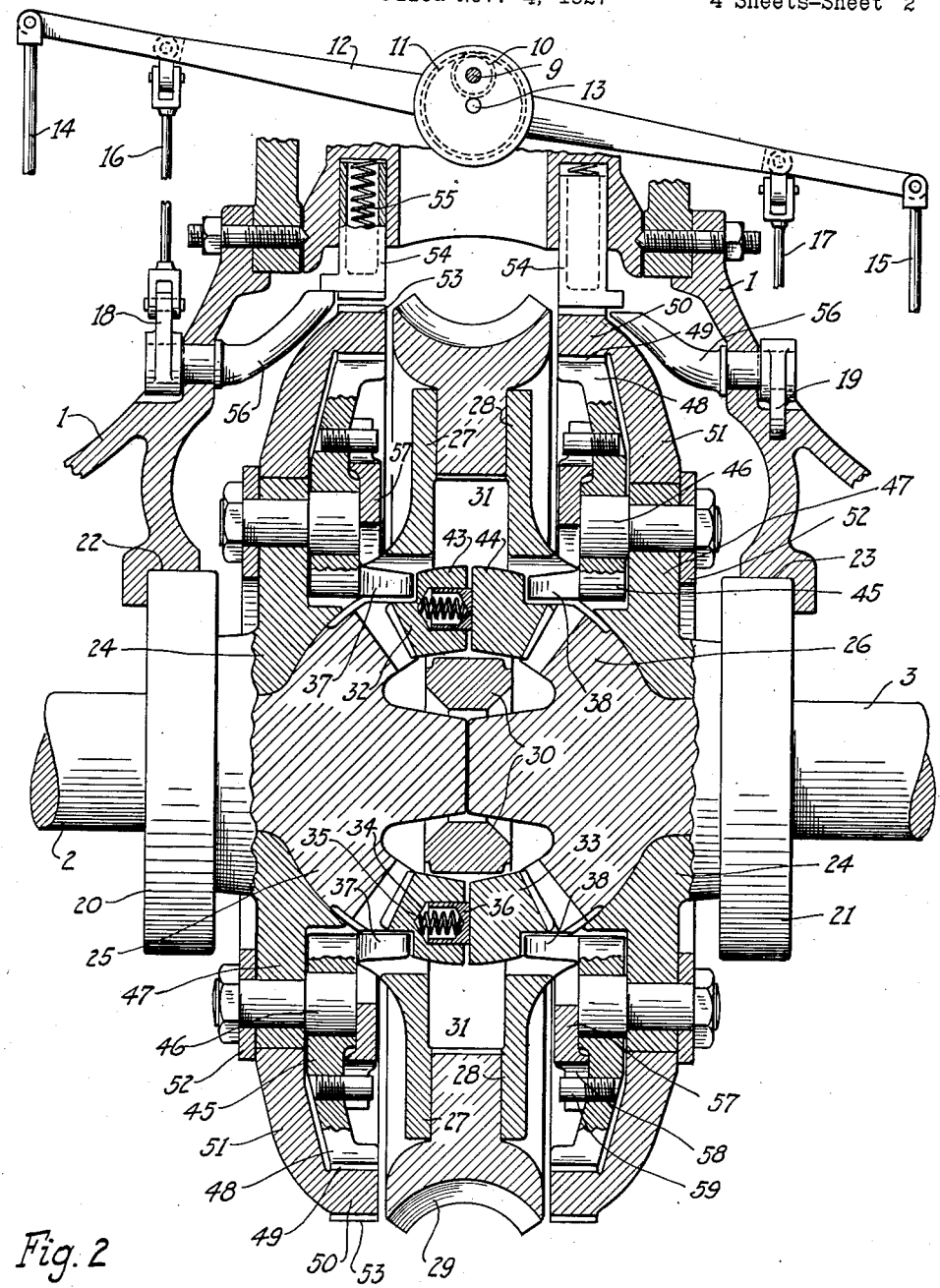
Fig. 2 is a sectional view of the clutch mechanism taken on a plane with the axis of the driving axles.

Referring to Fig. 2, the two driving axles 2 and 3 have their bearings respectively within two collars 20 and 21, which latter are operatively supported in suitable bearings indicated at 22 and 23 in the main housing or body of the tractor frame. The bearing collars 20 and 21 are rigidly secured to or integral with a revolving clutch housing 24 which is formed with a central chamber adapted to receive in rotative relation a pair of gear-like driven clutch elements 25 and 26 secured to or formed upon the inner ends of the driving axles.

The clutch housing 24, preferably formed in laterally divided half sections, is provided with a pair of radially extending spaced flanges 27 and 28 within which is supported and rigidly secured the annular inner web of a worm wheel 29, the latter having conventional driven engagement with a worm (not shown) carried by or in driven connection with the shaft of the tractor motor.

Inwardly of the worm wheel 29 and positioned between the two clutch elements 25 and 26 carried by the respective axles, is a driving spider 30, preferably having four radially extending arms 31, the outer ends of which are engaged in suitable recesses formed in the differential housing 24.

Positioned between the two driven clutch elements and within the central chamber of the clutch housing, are a pair of clutch rings 32 and 33, the lateral outward faces of which are respectively formed with teeth adapted for engagement with the teeth of the clutch elements 25 and 26, the clutch ring teeth being preferably of twice the number of the teeth of the latter elements. The rings 32 and 33 are freely supported upon the center portion 30 of the driving spider, and are provided with recesses formed in their adjacent inner faces through which project the radial arms 31 of the driving spider.

The clutch rings 32 and 33 may each be moved laterally outward into engagement with the teeth of the respective elements 25 and 26, and either or both of them, when moved laterally inward, are disengaged from those elements to permit the free operation of the latter with respect thereto. The clutch rings 32 and 33 are normally actuated into engagement with their respective elements by means of a plurality of compression springs interposed between the two rings. The arrangement herein disclosed provides a plurality of pockets 34 formed in the inner face of one of the rings, within each of which is confined a compression spring 35 outwardly bearing upon a cap 36 slidably positioned in the pocket and endwardly bearing upon the inner face of the other of the clutch rings.

The clutch rings 32 and 33 may be selectively shifted into or out of engagement with their complementary elements 25 and 26 by means of a series of cams, of which an arrangement of four is illustrated in association with each ring and indicated at 37 and 38.

Figure 4:
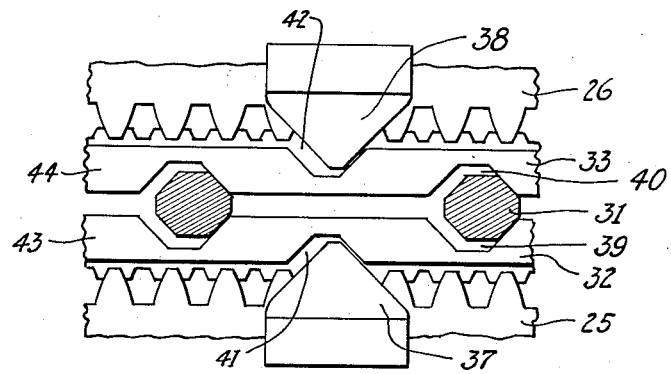
Figs. 4, 5 and 6 are fractional detailed views of the engaging elements of the respective driving wheel clutches in the several positions in which they may be operated.

First describing the action of the cams upon the clutch rings, reference is made to Figs. 4, 5, 6 and 7, in each of which is illustrated a plane development of a portion of the circumferential contour of the rings and clutch elements in their relation to the driving arms of the spider and the shifting cams. In Fig. 4, both of the rings 32 and 33 are shown in driving engagement with the elements 25 and 26, the rings being held in such engagement by the driving force of the spider arms 31 against the opposed inclined forward faces of the recesses 39 and 40 in the respective rings provided for the reception of the spider arms.

It will be noted that there is substantial clearance between the side and rear faces of the respective recesses and the spider arms in the position illustrated in Fig. 4, which permits relative rotative movement between the clutch rings and the driving spider. It will also be noted that the angle of the inclined faces of the recesses is in such relation to the angle of the sides of the teeth of the clutch rings that, when power is being transmitted through the spider arms, the tendency of the clutch rings to move away from the clutch elements is counteracted by the lateral pressure upon the clutch rings by the spider arms, and the rings are thus held in engagement with the respective clutch elements.

Positioned between the spider arms are the ring shifting cams 37 and 38 having lateral faces inclined to the plane of rotation of the rings and extending into recesses 41 and 42 formed in the outer lateral faces of radial flanges 43 and 44 provided on the clutch rings outwardly of the series of teeth engaged with the clutch elements. The movement of either of the cams 37 and 38, as will hereinafter be described, in the direction of rotation of the clutch rings will effect the advancement of that ring ahead of the other ring, thereby freeing the ring so moved from the driving faces of the spider arms, and by reason of the angular face of the cam will effect the movement of the advanced ring axially inward and out of engagement with its respective clutch element, whereupon the ring turns freely with the spider arms.

Figure 5:
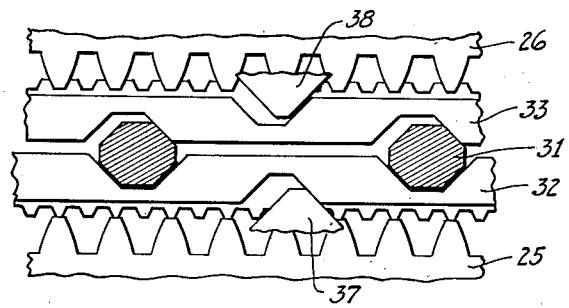
Figure 6:
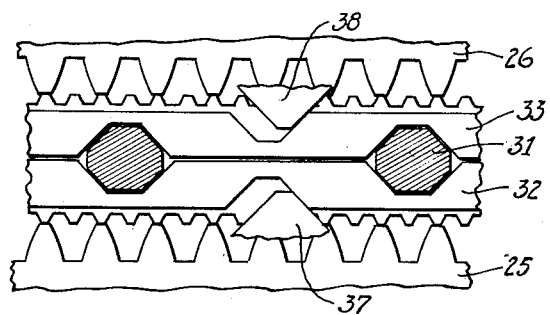
Figure 7:
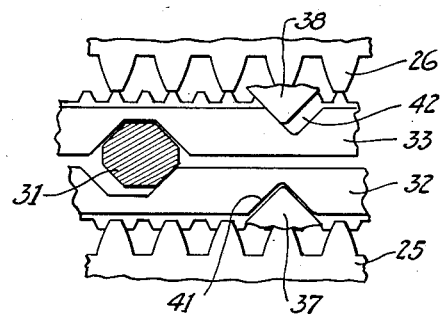
Fig. 7 illustrates a modified form of the clutch members shown in Figs. 4 to 6.

The relation last described is illustrated in Fig. 5 which shows one of the axle driving clutch elements to be engaged with its respective clutch ring and the other to be free. In Fig. 6 both cams have been operated to advance their respective clutch rings, and both rings are operating free from their respective clutch elements, with the effect that both driving wheels are disengaged from the power. Fig. 7 illustrates a slightly modified form adapted for automatic actuation of the parts in case of external acceleration of one of the treads, as when one tread passes over an obstruction which relatively increases its path of travel and would otherwise effect an undesired turn in direction of travel of the tractor. In this form there is no substantial clearance between the cams and recesses in the rings, and, with the cams in normal position, a relatively forward movement of one of the rings caused it to be engaged with the inclined rear face of its cam, thereby forcing it out of engagement with its clutch element into free position until both treads are again operating at like speed.

Figure 3:
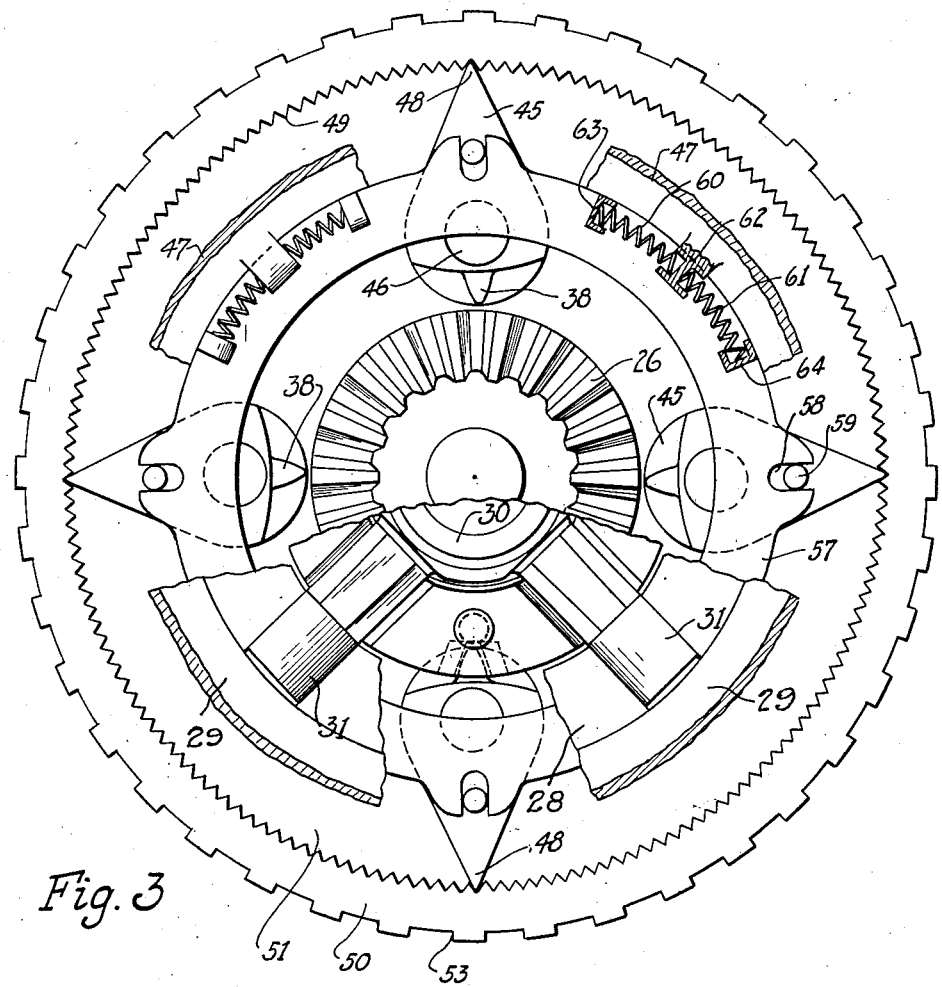
Fig. 3 is a cross sectional view of the differential mechanism taken on a plane perpendicular to the axis of the axles.

In Figs. 2 and 3 the clutch ring releasing cams are illustrated at 37 and 38, the cams being of identical formation and spaced about the clutch assembly between the spider arms 31. Each cam is supported upon an operating structure comprising a lever 45 pivoted upon a stud 46 rigidly secured in an annular flange 47 formed upon or rigidly secured to each of the lateral sections of the housing 24. Each of the cam levers 45 extends radially outward and terminates in a wedge shaped formation 48 adapted for engagement with an annular series of ratchet teeth 49 provided on the inner periphery of a ring 50 formed laterally on the outer margin of a supporting frame 51. The frames 51 are of annular shape operatively supported on the outer periphery of the flanges 47 respectively for concentric rotation thereabout, and retained against lateral displacement by a flat ring 52 suitably secured in position as by the shanks of the pivot studs 46.

The outer periphery of the marginal ring 50 of each of the frames 51 is provided with a continuous annular series of clutch teeth 53 which, in the rotation of the two frames with the clutch assembly, pass respectively before a pair of engaging plungers 54. The plungers 54 are slidable on axes in radial relation to the frames 51, and are supported in suitable recesses provided in the tractor body housing. The respective plungers are resiliently impelled toward the rotating frames 51 by means of compression springs 55 housed within suitable recesses provided in the plungers and confined between the plungers and the base of the recesses in the housing. The plungers 54 are controlled by means of retaining levers 56 rotatably supported in suitable bearings in the main body housing and upon which are outwardly mounted the operating cranks 18 and 19, previously described as controlling the clutch mechanism.

With the plungers 54 held out of engagement with the clutch teeth on the frames 51 the cam levers 45 are in normal position, as illustrated in Fig. 3, to effect driving engagement between both clutch rings and their respective clutch elements as represented in Fig. 4. It being desired to make a turn in the direction of travel of the tractor, the steering bar 12 is operated by the wheel 8 to swing the plunger retaining lever 56 out of retaining contact with the plunger 54 on the side toward which it is desired to turn the tractor, permitting that plunger to effect engagement with the clutch teeth of the frame 51 on that side. Such engagement stops the rotative movement of the frame, and by reason of the engagement of the pointed extremities of the cam levers 45 with the inner ratchet teeth of the frame ring, the continued rotation of the cam lever supporting structure 47 effects the swinging of the cam levers about their pivotal axis and the advancement of their cam faces in engagement with the clutch ring on that side at a speed greater than the normal speed of rotation of the ring, thus advancing the latter out of contact with the driving arms of the spider and forcing the ring out of engagement with its clutch element, as previously described. Thereafter the extremities 48 of the cam levers pass over the ratchet teeth of the frame ring which has been arrested in movement. While thus disengaged the tread on the opposite side of the tractor is being propelled by power and effects the turning movement of the tractor.

It is desirable to synchronize the operation of the several cam levers, and to that end is provided an annular member 57 in association with the groups of cams on each side of the clutch assembly, each of the annular members having radial slots 58 provided in alinement with the radial axis of the respective cams, in each of which is engaged a pin 59 fixed in one of the cams. By this means it will be obvious that the movement of the cams for the shifting of the clutch ring must be uniform.

When it is desired to straighten the direction of travel of the tractor, the released clutch ring is re-engaged with its axle driving clutch element by swinging the steering wheel to centered position whereby the plunger 54 is withdrawn from engagement with the clutch teeth of the frame 51, releasing the latter for rotation with the clutch assembly. The frame 51 is restored to normal relation by means of one or more pairs of compression springs illustrated at 60 and 61 in Fig. 3, the springs having opposed bearings on opposite sides of a lug 62 carried by the flange 47 and outwardly confined by lugs 63 and 64 mounted upon the timing ring 57. Upon release of the frame ring from engagement by the plunger 54, the springs 60 and 61 effect the return of the cam levers 45 to centered position whereby the latter are re-engaged at their outer ends with the inner ratchet teeth on the frame ring 50, and the cam faces in engagement with the released clutch ring are withdrawn to normal position. Thereupon, the clutch ring is urged outwardly into engagement with its respective clutch element by the inclined faces of the driving arms of the spider, the rings and spider then assuming the driving relation illustrated in Fig. 4.

I claim as my invention:

1. In mechanism of the class described, a pair of alined axles, a pair of toothed clutch elements, rigidly mounted on said axles, a pair of axially movable toothed clutch rings between said clutch elements and having opposed radial recesses, means urging said rings into engagement with said elements, a driving member having radial arms engaged within said recesses, a housing rotatably mounted on said axles, cam levers pivoted on said housing having operative engagement with said clutch rings and effective to rotate said rings relative to said clutch elements, a pair of actuating rings rotatably mounted adjacent said cam levers having inner peripheral teeth normally engaging said cam levers and having outer peripheral teeth, a pair of annular members having operable connections with said cam levers to synchronize the movement of said levers, resilient means connecting said housing and said guide rings normally effecting the centering of position of said cam levers, a pair of sliding plungers having stationary support and adapted to engage the outer peripheral teeth of said actuating ring to arrest rotation of said ring, and a pair of levers respectively controlling said plungers and adapted for operable connection with the steering gear of a tractor.

2. In mechanism of the class described, a pair of alined axles, a pair of toothed clutch elements rigidly mounted on said axles, a pair of axially movable toothed clutch rings between said clutch elements and having opposed radial recesses, means urging said rings into engagement with said elements, a driving member having radial arms engaged within said recesses, a housing having opposite sections rotatably mounted on said axles respectively, cam levers pivoted on each of said housing sections having operable engagement with their adjacent clutch rings and effective to rotate said rings relative to said clutch elements, a pair of actuating rings rotatably mounted adjacent said cam levers having inner peripheral teeth normally engaging said cam levers and having outer peripheral teeth, a pair of annular members having operable connections with said cam levers to synchronize the movement of said levers, a pair of sliding plungers having stationary support and adapted to engage the outer peripheral teeth of said actuating ring to arrest rotation of said ring, and a pair of levers respectively controlling said plungers and adapted for operable connection with the steering gear of a tractor.

3. In mechanism of the class described, a pair of alined axles, a pair of toothed clutch elements rigidly mounted on said axles, a pair of axially movable toothed clutch rings between said clutch elements and having opposed radial recesses, means urging said rings into engagement with said elements, a driving member having radial arms engaged within said recesses, a housing having opposite sections rotatably mounted on said axles, cam levers pivoted on each of said housing sections having operable engagement with their adjacent clutch ring and effective to rotate said rings relative to said clutch elements, a pair of actuating rings rotatably mounted outwardly of said cam levers and having inner peripheral teeth normally engaging said cam levers and having outer peripheral teeth, a pair of movable plungers having stationary support and adapted to engage the outer peripheral teeth of said actuating ring to arrest rotation of said ring, and a pair of levers respectively controlling said plungers adapted for operable connection with the steering gear of a tractor.

4. In mechanism of the class described, a pair of alined axles, a pair of clutch elements rigidly mounted on said axles, a pair of axially movable clutch rings between said clutch elements and having opposed radial recesses, means urging said rings into engagement with said elements, a driving member having radial arms engaged within said recesses, a housing rotatably mounted on said axles, cam levers pivoted on opposite sides of said housing having operative engagement with the adjacent clutch ring and effective to rotate said rings relative to said clutch elements, a pair of actuating rings rotatably mounted adjacent said cam levers and having inner peripheral teeth normally engaging said cam levers, and means for selectively arresting said cam lever actuating rings.

5. In mechanism of the class described, a pair of alined axles, a pair of clutch elements rigidly mounted on said axles, a pair of axially movable clutch rings between said clutch elements having opposed radial recesses, means urging said rings into engagement with said elements, a driving member having radial arms engaged within said recesses, a housing rotatably mounted on said axles, cam levers pivoted on each side of said housing having operative engagement with the adjacent clutch ring and effective to rotate said rings relative to said clutch elements, a pair of actuating rings rotatably mounted outwardly of said cam levers and having inner peripheral teeth normally engaging said cam levers, a pair of slidable plungers having stationary support and adapted to engage said actuating rings to arrest rotation of said rings, and means for selectively causing the engagement of said plungers with said actuating rings.

6. In mechanism of the class described, a pair of alined axles, a pair of clutch elements rigidly mounted on said axles, a pair of clutch rings between said elements having opposed radial recesses, means resiliently urging said rings into engagement with said elements, a driving member having radial arms engaged within said recesses, pivotally supported cam levers having operative engagement with said clutch rings and operable to rotate said rings relative to said clutch elements, a pair of actuating rings rotatively mounted adjacent said cam levers and having inner peripheral teeth normally engaging said cam levers, and means for selectively arresting the rotative movement of said cam lever actuating rings.

7. In mechanism of the class described, a pair of alined axles, a pair of toothed clutch elements rigidly mounted on said axles, a pair of clutch rings freely positioned between said clutch elements and having spaced opposed radial recesses, a driving member having radial arms engaged within said recesses, a housing rotatably mounted on said axles, cam levers pivoted on said housing having operative engagement with said clutch rings and effective to rotate said rings relative to said clutch elements, a pair of cam lever actuating rings rotatively mounted on said housing and having peripheral teeth adapted for normal engagement with said cam levers, and means for selectively arresting the rotative movement of said actuating rings.

8. In mechanism of the class described, a pair of endwardly adjacent alined axles, a pair of toothed annular clutch elements rigidly mounted on said axles, a pair of axially and rotatively movable clutch rings positioned between said clutch elements and having spaced opposed lateral recesses, a driving member having radial arms engaged within said recesses, a housing rotatably mounted on said axles, cams pivotally mounted on said housing having operative engagement with said clutch rings respectively, said cams having angularly disposed faces effective to move said clutch rings axially inward with the pivotal movement of said cams, and means for selectively effecting said movement of said cams.

9. In mechanism of the class described, a pair of endwardly adjacent alined axles, a pair of toothed annular clutch elements rigidly mounted on said axles respectively, a pair of axially and rotatively movable clutch rings positioned between such clutch elements and having opposed radial recesses, a driving member having radial arms engaged within said recesses, a housing rotatably mounted on said axles, and a plurality of cams mounted on said housing and having operative engagement with the respectively adjacent clutch rings, said cams being effective to move said clutch rings axially inward with the acceleration of speed of said clutch elements above the speed of said driving member.

10. In mechanism of the class described, a pair of alined axles, a pair of annular clutch elements carried by said axles respectively, a pair of clutch rings between said clutch elements rotatable concentrically with said elements and movable laterally relative thereto, a driving member having a driving connection with said rings normally effective to cause engagement between said rings and said clutch elements for the transmission of power to said axles, and a plurality of cams having pivotal support in fixed relation to said driving member, said cams having operative engagement with said clutch rings respectively and being operable to accelerate the rotative movement of said rings and thereby selectively release said rings laterally from engagement with said clutch elements.

11. In mechanism of the class described, an axle, a clutch element rigidly mounted thereon, a clutch ring concentrically rotatable with and relative to said element and laterally movable into and out of driving engagement with said element, a driving member having driving engagement with said ring normally effective to maintain engagement between said ring and said element, a cam having operative engagement with said ring, and means for actuating said cam to produce a combined rotative and lateral movement of said ring out of engagement with said element.

12. In mechanism of the class described, an axle, a clutch element rigidly mounted thereon, an axially and rotatably movable clutch ring associated with said clutch element and adapted for selective driving engagement therewith, a driving member having driving engagement with said clutch ring, and a cam mounted in constant relation to said driving member and having operative engagement with said clutch ring, said cam being effective to force said clutch ring axially out of engagement with said clutch element upon the acceleration of speed of said clutch element over the speed of said driving member.

13. In mechanism of the class described, a pair of clutch elements in spaced alined relation, a pair of clutch rings between said elements and adapted to have driving engagement therewith respectively, a driving member having driving engagement with said clutch rings, cam levers movably supported in constant relation to said driving member and having operative engagement with said clutch rings, said cam levers being selectively operable to rotate said clutch rings relative to said clutch elements and thereby cause disengagement between said clutch rings and said clutch elements, and means for actuating said cam levers.

In testimony whereof, I have hereunto affixed my signature.

JOHN W. TATTER.